(No Model.)

J. W. CUTHBERTSON.
TIRE TIGHTENER.

No. 494,507. Patented Mar. 28, 1893.

Witnesses
A. Edmunds
Jas. E. Edmunds

Inventor
James W. Cuthbertson
By P. J. Edmunds
Atty

UNITED STATES PATENT OFFICE.

JAMES W. CUTHBERTSON, OF BOTHWELL, ASSIGNOR, BY DIRECT AND MESNE ASSIGNMENTS, TO ALEM J. GREEN, OF ESSEX, CANADA.

TIRE-TIGHTENER.

SPECIFICATION forming part of Letters Patent No. 494,507, dated March 28, 1893.

Application filed June 27, 1892. Serial No. 438,064. (No model.)

*To all whom it may concern:*

Be it known that I, JAMES W. CUTHBERTSON, a subject of the Queen of Great Britain, and a resident of Bothwell, in the Province of Ontario, Canada, have invented a new and useful Stationary Tire-Set, of which the following is a full, clear, and exact description.

This invention relates to a device for tightly compressing the wheel in such a manner, that the tire, fellies, &c., will be rigidly held together. And it consists of the improved construction and combination of parts of the same, as will be hereinafter first fully set forth and then pointed out in the claim.

Figure 1:
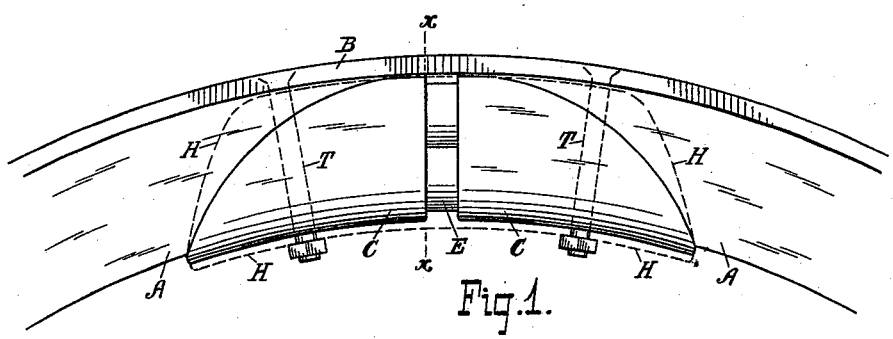
Figure 2:
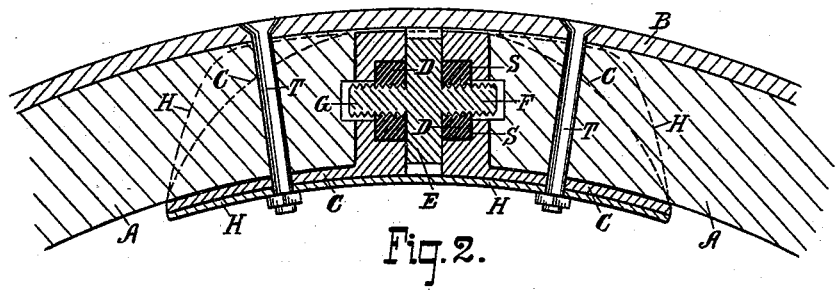
Figure 3:
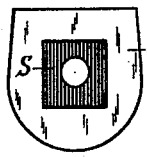

In the accompanying drawings, Figure 1. is a side view of a portion of a wheel, illustrating my invention, the felly-plate being shown by dotted line. Fig. 2. is a central, longitudinal, sectional, view of same. Fig. 3. is an end view of one of the shields on the line $x$, $x$, of Fig. 1.

A source of trouble with continuous tires or iron bands on wheels, formed of wooden fellies, is the shrinkage of the timber, particularly when green, rendering the cutting and resetting of the tires necessary, all of the latter is obviated, and done away with, by using my invention.

A, A, designate the fellies, or wooden portion of the wheel. B, the tire, or iron rim thereof; and C C, the sheaths which cover a portion of the ends of said fellies and, H, a felly-plate, all securely held together by the tire-bolts, T. In each of these sheaths, C, a square socket, S, is formed.

D, D, are nuts fitted thereto, and placed in said sockets; a screw having a head, E, at mid length, and right and left screws, F, G, engages with the nuts, D, D. Two of these devices are preferably used on each wheel, but any number may be used, and when secured in place, as shown in Fig. 2, by turning the head, E, the right and left screws, F, G, engaging with the nuts, E, compress the fellies apart, and both the same proportionate distance, and not only rigidly bind the fellies and tire together, but also rigidly bind the hub and spokes therewith, this is the result when wishing to tighten the parts together, after shrinkage. If the fellies, A, were exposed to, and absorbed any considerable amount of wet, they being formed of wood, would be liable to swell; to prevent damage to the wheel, under these circumstances, the head, E, of the screw is turned to reduce the compression on the fellies, this relieves them, and prevents any damage thereto.

Having thus described my invention, I claim—

In a tire-set, the combination with the shields each having a recess in its outer side to receive the end of the felly, and having a squared recess in its inner face, of the nuts arranged in said recesses in the inner faces of the shields and the right and left screws engaging the respective nuts, said screws having a mid-head arranged between said shields, substantially as set forth.

In testimony whereof I affix my signature in the presence of the two undersigned witnesses.

JAMES W. CUTHBERTSON.

Witnesses:
CHAS. E. BAYLEY,
W. R. HICKEY.